United States Patent
Buzbee et al.

[11] Patent Number: 5,713,010
[45] Date of Patent: Jan. 27, 1998

[54] SOURCE LINE TRACKING IN OPTIMIZED CODE

[75] Inventors: William B. Buzbee, Half Moon Bay; Michelle A. Ruscetta, San Jose, both of Calif.

[73] Assignee: Hewlett-Packard Company, Palo Alto, Calif.

[21] Appl. No.: 387,054

[22] Filed: Feb. 10, 1995

[51] Int. Cl.$^6$ ............................................. G06F 15/00
[52] U.S. Cl. .................................................. 395/507
[58] Field of Search ................................. 395/155, 161, 395/575, 507, 514, 515, 788, 789

[56] References Cited

U.S. PATENT DOCUMENTS 5,550,972  8/1996  Patrick et al. ........................... 395/507

OTHER PUBLICATIONS

Max Copperman, *Debugging Optimized Code Without Being Misled*, UCSC-CRL-93-21, Jun. 11, 1993.

*Primary Examiner*—Phu K. Nguyen

[57] ABSTRACT

Source code is compiled into intermediate code which includes object code instructions. Logical line markers are inserted within the intermediate code. Each logical line marker identifies a source code line from which originated object code instructions immediately adjacent to the logical line marker. Each logical line marker is associated with a specific basic block. Also, actual line markers are inserted so that an actual line marker is associated with every object code instruction. The actual line marker identifies a source code line from which originated the object code instruction associated with the actual line marker. The intermediate code is optimized to produce the optimized object code. During optimization, object code instructions are freely moved relative to the logical line markers; however, the logical line markers are not moved relative to each other. When an object code instruction is moved, the actual line marker associated with the moved object code instruction is also moved.

21 Claims, 3 Drawing Sheets

SOURCE LINE TRACKING IN OPTIMIZED CODE

BACKGROUND

The present invention is generally concerned with debugging code which has been compiled using an optimizing compiler, and more particularly with providing source code line tracking in optimized object code.

Programming code is generally written in a high level programming language. This high level language, often referred to as source code, is translated by a compiler program into assembly language. The binary form of the assembly language, called object code, is the form of the code actually executed by a computer.

Code debuggers are programs which aid a programmer in finding errors in code. They are extremely useful tools for improving the efficiency of the code debugging process. Many code debuggers supply information pertaining to operation of the code on the assembly code level. If the original code is written in a higher level language, however, this makes program debugging a difficult operation. When a programmer writes his program in a high level language, he does not want to search for the appearance of these errors in the assembly code.

To avoid this problem, it is desirable to develop debugger programs which allow a programmer to debug his program with reference to the level of code in which he originally wrote the program. Such a debugger program is often called a source-level debugger.

One of the important features of a code debugger is to allow a programmer to stop the execution of code and to check the values in each user resource the code is operating upon. A user resource is typically a variable defined in the source code. The values in the user resources give clues to indicate the source of trouble when a program is not operating correctly.

Since the computer operates on object code, a source level (or symbolic) debugger needs to know where user resources named in the source code are actually stored by the computer during operation, so that when a user requests the current value for a user resource, the debugging program knows where to find the user resource. Typically, a compiler will allocate a single storage location for each user resource. In this case, the debugger need simply go to the location and access the value of the user resource.

With increasing frequency, compilers are used which generate optimized code. Usually the design goal of an optimizer within a compiler is to generate code that executes as fast as possible. In optimized code it may be desirable not to store a user resource in the same place all the time. For instance, if a user resource is accessed often and/or modified often in a particular section of code, during execution of that particular section of code the current value of a user resource may be stored in a register which is accessed and updated, without concurrent update of any other storage location.

In addition, optimizing compilers sometimes change the order in which individual instructions are executed. That is optimizers within compilers are often sophisticated enough to recognize cases in which performance of code execution can be increased by altering execution order of code from the execution order originally set out in the source code. The important thing is not to execute every statement in the exact order set out by the source code, but rather to maintain the order dependencies.

However, when optimizing compilers change the execution order this introduces difficulties for source-level debuggers. For example, when the execution order of code has been changed and a user requests a debugger to halt execution at a particular line of source code, it may be difficult for the user to ascertain exactly what lines of source code have already been executed and which are yet to be executed.

SUMMARY OF THE INVENTION

In accordance with the preferred embodiment of the present invention, a method is presented for compiling source code into optimized object code. The source code is compiled into intermediate code which includes object code instructions. Logical line markers are inserted within the intermediate code. Each logical line marker identifies a source code line from which originated object code instructions immediately adjacent to the logical line marker. In the preferred embodiment, the object code instructions are divided into basic blocks which contain the logical line markers and the object code instructions. Also, in the preferred embodiment, actual line markers are inserted so that an actual line marker is associated with every object code instruction. The actual line marker identifies a source code line from which originated the object code instruction associated with the actual line marker. The intermediate code is optimized to produce the optimized object code. During optimization, object code instructions are freely moved relative to the logical line markers; however, the logical line markers are not moved relative to each other. When an object code instruction is moved, the actual line marker associated with the moved object code instruction is also moved.

In the preferred embodiment, during optimization, no logical line marker is moved outside a basic block in which the logical line marker was originally placed. Also, when an entire basic block is duplicated, all logical line markers contained by the entire basic block are duplicated. When a basic block is rendered unexecutable, all logical line markers contained by the basic block rendered unexecutable are marked as unexecutable. During optimization, no logical line markers are deleted.

The present invention facilitates the tracking of both the actual locations in object code where a source code line is executed, as well as correlates logical control flow of object code and the source code from which the object code originates. This can be a significant help in the debugging of optimized object code.

DESCRIPTION OF THE PREFERRED EMBODIMENT

Figure 1:
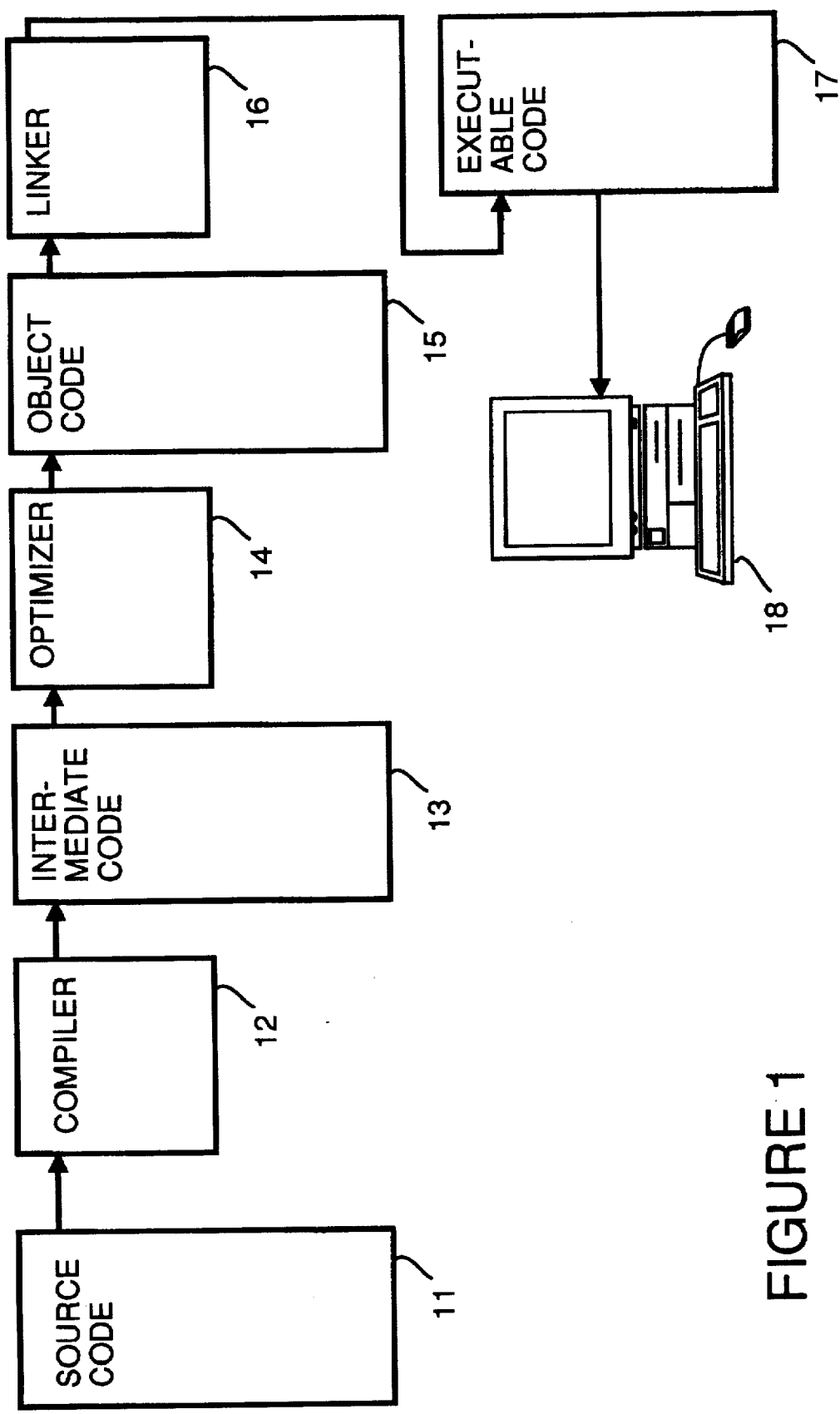
FIG. 1 shows a block diagram of a compiler system in accordance with a preferred embodiment of the present invention.

FIG. 1 shows a block diagram of a compiler system. A compiler 12 receives source code 11 and produces intermediate code 13. The intermediate code is a list of object (assembly) language instructions. An optimizer 14 receives the intermediate code 13 and produces optimized object code 15. A linker 16 receives optimized object code 15 and produces executable code 17. Executable code 17 may then be executed by a computing system 18.

Optimizer 14 generates optimized object code that executes as fast as possible. In order to achieve this, optimizer 14 sometimes changes the order in which individual object code instructions are executed. This is done, for example, when optimizer 14 recognizes a case in which performance of code execution can be increased by altering execution order of object code instructions from the execution order resulting from an initial (non-optimized) compile of the source code. The order of execution of object code instructions is changed only when this may be done without altering the order dependencies between object code instructions.

However, when optimizer 14 changes the execution order of code, this can introduce difficulties for source-level debuggers. For example, when the execution order of code has been changed and a user requests a debugger to halt execution at a particular line of source code, it may be difficult for the user to ascertain exactly what lines of source code have already been executed and which are yet to be executed.

In order to account for these problems, the preferred embodiment of the present invention tracks two types of code locations. That is, within optimized code, the preferred embodiment of the present invention keeps track of source code lines by marking both an "actual code location" and a "logical line location." What is meant by actual code location is the actual location within optimized object code which contains the actual object code instructions into which a particular source code line was compiled. What is meant by logical line location is the location within the optimized object code which corresponds to the point in the control flow that the original source code instruction was placed within the original source code.

Of course in unoptimized locations, both the actual code location and the logical line location is the generally the same for each source code line. However, for optimized code, these actual code location may be different than the logical line location.

For example, consider the source code fragment in Table 1 below:

TABLE 1

| Line Number | Source Code |
| --- | --- |
| 1 | i=4 |
| 2 | j=6 |
| 3 | k=i |

The execution order of the source code could be line 1, line 2, line 3. Generally, an unoptimized compilation would retain this execution order within the object code. However, an optimizer might alter the execution. For example, within optimized object code, the execution order could be line 2, line 1 line 3, or even line 1, line 3, line 2. The only restriction on changing the execution order of these instructions is to assure that line 3 is executed after line 1, because the source code in line 3 utilizes the result of the source code in line 1.

Changing the execution order of code can result in confusion when the code is debugged. For example, consider the original source code in Table 2 below:

TABLE 2

| Line Number | Source Code |
| --- | --- |
| 9 | k=5 |
| 10 | for (i=0;i<10;i++) { |
| 11 | j=k |
| 12 | arr1 [i] = arr2 [j]; |
| 13 | } |

For the example, assume optimizer 14 recognizes that line number 11 does not have any dependency on line 10 or line 12, and thus can be moved outside the body of the loop which includes lines 10, 12 and 13. The resulting execution order is as in Table 3 below:

TABLE 3

| Object Code Offset | Optimized Code |
| --- | --- |
| 0x80 | k=5 |
| 0x84 | j=k |
| 0x88 | for (i=0;i<10;i++) { |
| 0x8C | arr1 [i] = arr2 [j]; |
| 0x90 | } |

Using the preferred embodiment of the present invention, when the optimized code is executing and is interrupted with the program counter (PC) at 0x84, two valid locations may be reported. The actual code location is source line 11. This is because optimized code line 84 performs the code set out in source code line 11. The logical line location is source line 9. This is because the program has not yet entered the logical loop beginning at source code line 10.

Likewise, if a user requests a debugger to halt execution at source code line 11, the preferred embodiment of the present allows the debugger to stop at either one of two locations. If the actual code location is desired, then execution will be halted at line number 0x84. If the logical line location is used, then execution will be halted at line number 0x8C.

Figure 2:
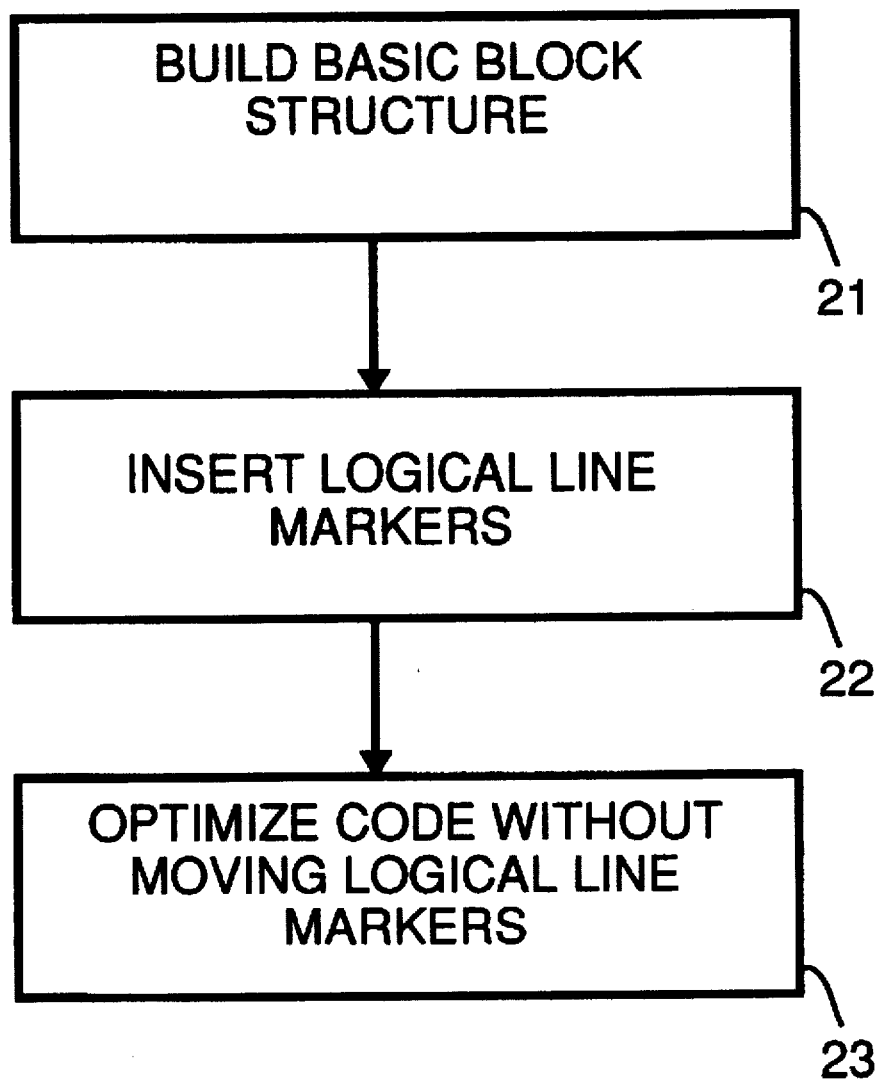
FIG. 2 is a flowchart which illustrates a method for tracking the logical line location of source code in accordance with a preferred embodiment of the present invention.

FIG. 2 sets out how the logical line location is tracked in the preferred embodiment of the present invention. In a step 21, the intermediate code for a program is associated into a basic block structure. In a step 22, logical line markers are inserted. Particularly, for each line in the original source program for which there is corresponding object code in the basic block structure, a label is inserted into the basic block structure immediately preceding the first corresponding object code instruction.

In a step 23, the code is optimized without moving logical line markers. More specifically, during optimization, object code may be freely moved relative to the logical line marker. However, the logical line markers do not move relative to each other, nor is any logical line marker moved outside the basic block in which it originally is placed.

In the preferred embodiment of the present invention, several additional rules are observed during optimization. For example, logical line markers are not deleted during optimization. If an entire basic block is duplicated, all of the logical line markers contained by the basic block are also duplicated. If a basic block which contains one or more logical line markers is rendered unexecutable, the logical line markers which the basic block contains are marked as unexecutable. Additional rules may be added as necessary, for example, to handle special cases such as loop unrolling, software pipelining, code inlining and basic block deletion, etc.

Figure 3:
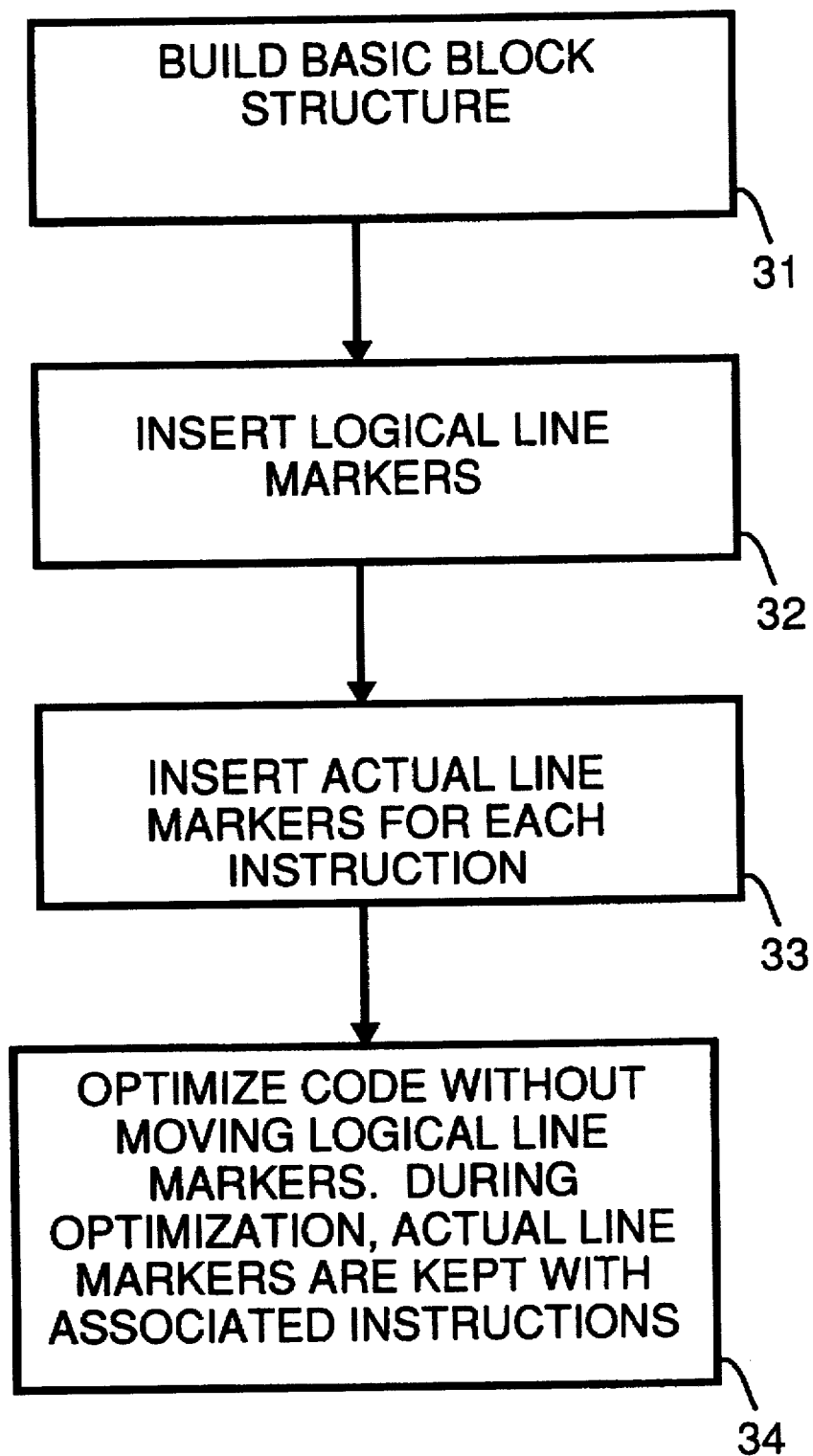
FIG. 3 is a flowchart which illustrates a method for tracking both the logical line location and the actual line location of source code in accordance with an alternate preferred embodiment of the present invention.

FIG. 3 sets out how both the logical line location and the actual line location can be tracked. In a step 31, the intermediate code for a program is associated into a basic block structure. In a step 32, logical line markers are inserted. Particularly, for each line in the original source program for which there is corresponding object code in the basic block structure, a label is inserted into the basic block structure immediately preceding the first corresponding object code instruction. Each logical line marker is associated with a specific basic block. In a step 33, actual line markers are inserted for each instruction. That is, each object code instruction in the basic block structure is labeled with the source line number of the source code instruction for which the object code instruction was generated. In the preferred embodiment, the labels used are attributes of the object code instruction In a step 34, the code is optimized without moving logical line markers. More specifically, during optimization, object code may be freely moved relative to the logical line markers. However, the logical line markers do not move relative to each other, nor is any logical line marker moved outside the basic block in which it originally is placed. However, the actual line markers are kept with associated object code instructions. Particularly, if an object code instruction is moved, the actual line mark associated with the object code likewise moves. If the object code instruction is deleted, its actual line mark also is deleted. If an object code instruction is duplicated, its actual line marker is also duplicated. If because of common sub-expression elimination, peephole or similar optimization, instructions on which actual line markers representing different source lines are combined, their actual line markers are also combined.

The following three examples are given to illustrate operation of the present invention, as described above. The first example illustrates what happens when code is moved outside of the originating basic block. For the first example, the source code segment is as set out in Table 4 below:

TABLE 4

| Line Number | Source Code |
|---|---|
| 9 | for (b=0;b<100;b++) { |
| 10 | a = arg * 12; |
| 11 | c = a + b; |
| 12 | } |
| 13 | |
| 14 | return (c) |

In steps 31 through 33, the basic block structure is built, logical line markers and actual line markers are inserted to produce the object code set out in Table 5 below. For clarity, each logical line marker is set out in a separate line of code using the following format: ";LLM <source code line number> <source code instruction><Carriage Return>." Each actual line markers is placed at the end of an object code instruction using the following format: "(ALM <source code line number>)."

TABLE 5

| Basic Block (BB) 1 (loop preheader) | |
|---|---|
| ;LLM 9 b = 0; b < 100 | |
| store 0, b | (ALM 9) |
| loadi 100, r31 | (ALM 9) |
| cmpbr,> b,100, BB 4 | (ALM 9) |

TABLE 5-continued

| Basic Block 2 (loop body) | |
|---|---|
| ;LLM 10 a = arg * 12 | |
| load arg | (ALM 10) |
| mult arg,12, r20 | (ALM 10) |
| store r20, a | (ALM 10) |
| ;LLM 11 c = a + b | |
| load a | (ALM 11) |
| load b | (ALM 11) |
| add | (ALM 11) |
| store c | (ALM 11) |
| Basic Block 3 (loop tail) | |
| ;LLM 9 b++ | |
| load b | (ALM 9) |
| addi 1 | (ALM 9) |
| store b | (ALM 9) |
| cmpbr,< b,100, BB 2 | (ALM 9) |
| Basic Block 4 | |
| ;LLM 14 return(c) | |
| load c | (ALM 14) |
| ret | (ALM 14) |

In step 34, optimization is performed. In the first example, all instructions generated for source line 10 are moved outside of basic block (BB) 2 into basic block 1. Note that instructions are moved freely within and across basic blocks, but the logical line markers retain their relative position with their originating basic block, and are never deleted. The resulting optimized code is as set out in Table 6 below. In Table 6, each logical line marker is set out in a separate line of code using the following format: ";LLM <source code line number> <Carriage Return>."

TABLE 6

| Basic Block 1 (loop header) | |
|---|---|
| ;LLM 9 | |
| load arg | (ALM 10) |
| mult arg,12, r20 | (ALM 10) |
| store r20, a | (ALM 10) |
| store 0, b | (ALM 9) |
| loadi 100,r31 | (ALM 9) |
| cmpbr,> b,100, BB 4 | (ALM 9) |
| Basic Block 2 (loop body) | |
| ;LLM 10 | |
| ;LLM 11 | |
| load a | (ALM 11) |
| load b | (ALM 11) |
| add | (ALM 11) |
| store c | (ALM 11) |
| Basic Block 3 (loop tail) | |
| ;LLM 9 | |
| add 1, b | (ALM 9) |
| cmpb,<,N b,100, BB 2 | (ALM 9) |
| Basic Block 4 | |
| ;LLM 14 | |
| load c | (ALM 14) |
| ret | (ALM 14) |

The second example illustrates what happens when a basic block is duplicated. For the second example, Table 7 below shows the intermediate code after the basic block structure is built, logical line markers are inserted and actual line markers are inserted in steps 31 through 33. In Table 6, each logical line marker is set out in a separate line of code using the following format: ";LLM <source code line number> <Carriage Return>." Each actual line markers is placed at the end of an object code instruction using the following format: "(ALM <source code line number>)."

TABLE 7

Basic Block 1 (loop preheader)

;LLM 9
    inst 1    (ALM 9)
    inst 2    (ALM 9)
    inst 3    (ALM 9)

Basic Block 2 (loop body)

;LLM 10
    inst 4    (ALM 10)
    inst 5    (ALM 10)
    inst 6    (ALM 10)
;LLM 11
    inst 7    (ALM 11)
    inst 8    (ALM 11)
;LLM 12
    inst 9    (ALM 12)
    inst 10    (ALM 12)
    inst 11    (ALM 12)
;LLM 13
    inst 12    (ALM 13)

Basic Block 3 (loop tail)

;LLM 9
    inst 13    (ALM 9)
    inst 14    (ALM 9)

Basic Block 4

;LLM 14
    inst 15    (ALM 14)
    inst 16    (ALM 14)
;LLM 15
    inst 17    (ALM 15)
    inst 18    (ALM 15)

In step 34, optimization is performed. In the second example, loop unrolling causes insertion of instructions into the loop preheader and the loop tail. Also, the loop body is duplicated. As discussed above, logical line markers and actual line markers are duplicated when basic blocks/instructions are duplicated. In addition, the optimization for example 2 includes miscellaneous movement of instructions to show how actual line markers are retained by the instruction, and how logical line location markers retain their relative positions within a basic block and remain within their originating basic block. The result of the optimization is shown in Table 8 below:

TABLE 8

Basic Block 1 (loop preheader)

;LLM 9
    inst 1    (ALM 9)
    inst 2    (ALM 9)
    inst 8    (ALM 11)
    inst 3    (ALM 9)
    inst 17 (new)    (ALM 9)
    inst 18 (new)    (ALM 9)
    inst 19 (new)    (ALM 9)

Basic Block 2.1 (loop body)

;LLM 10
    inst 5    (ALM 10)
    inst 11    (ALM 12)
    inst 6    (ALM 10)
;LLM 11
    inst 7    (ALM 11)
;LLM 12
    inst 9    (ALM 12)
    inst 10    (ALM 12)
;LLM 13
    inst 12    (ALM 13)

Basic Block 2.2 (loop body)

TABLE 8-continued

;LLM 10
    inst 5    (ALM 10)
    inst 11    (ALM 12)
    inst 6    (ALM 10)
;LLM 11
    inst 7    (ALM 11)
;LLM 12
    inst 9    (ALM 12)
    inst 10    (ALM 12)
;LLM 13
    inst 12    (ALM 13)

Basic Block 2.3 (loop body)

;LLM 10
    inst 5    (ALM 10)
    inst 11    (ALM 12)
    inst 6    (ALM 10)
;LLM 11
    inst 7    (ALM 11)
;LLM 12
    inst 9    (ALM 12)
    inst 10    (ALM 12)
;LLM 13
    inst 12    (ALM 13)

Basic Block 3 (loop tail)

;LLM 9
    inst 13    (ALM 9)
    inst 14    (ALM 9)
    inst 20 (new)    (ALM 9)
    inst 21 (new)    (ALM 9)

Basic Block 4

;LLM 14
    inst 15    (ALM 14)
    inst 16    (ALM 14)
;LLM 15
    inst 17    (ALM 15)
    inst 18    (ALM 15)

The third example illustrates what happens when a basic block is eliminated. Further, the third example illustrates common subexpression elimination (cse) optimization. For the third example, Table 9 below shows the intermediate code after the basic block structure is built, logical line markers are inserted and actual line markers are inserted in steps 31 through 33.

TABLE 9

Basic Block 1 (loop preheader)

;LLM 9
  inst 1    (ALM 9)
  inst 2    (ALM 9)
  inst 3    (ALM 9)

Basic Block 2 (loop body)

;LLM 10
    inst 4    (ALM 10)
    inst 5    (ALM 10)
    inst 6    (ALM 10)
;LLM 11
    inst 7    (ALM 11)
    inst 8    (ALM 11)
;LLM 12
    inst 9    (ALM 12)
    inst 10    (ALM 12)
    inst 11    (ALM 12)
;LLM 13
    inst 12    (ALM 13)

Basic Block 3 (loop tail)

;LLM 9
    inst 13    (ALM 9)
    inst 14    (ALM 9)

TABLE 9-continued

| ;LLM 14 | | |
|---|---|---|
| | inst 15 | (ALM 14) |
| | inst 16 | (ALM 14) |
| ;LLM 15 | | |
| | inst 17 | (ALM 15) |
| | inst 18 | (ALM 15) |

In the third example all instructions in basic block 2 are eliminated. In addition, instructions 1 and 5 were combined and instructions 15 and 17 were combined due to cse optimization. The combination of instructions caused their respective actual line markers to be combined. The result is shown in Table 10 below.

TABLE 10

| Basic Block 1 (loop preheader) | | |
|---|---|---|
| ;LLM 9 | | |
| | inst 1,5 | (ALM 9, ALM 10) {inst 1 and 5 merged} |
| | inst 2 | (ALM 9) |
| | inst 3 | (ALM 9) |
| Basic Block 2 (loop body) | | |
| ;LLM 10 | | |
| ;LLM 11 all instructions eliminated from this | | |
| ;LLM 12 block, so all logical line labels (10–13) | | |
| ;LLM 13 associated with this basic block are marked as unexecutable, | | |
| Basic Block 3 (loop tail) | | |
| ;LLM 9 | | |
| | inst 13 | (ALM 9) |
| | inst 14 | (ALM 9) |
| Basic Block 4 | | |
| ;LLM 14 | | |
| | inst 15,17 | (ALM 14, ALM 15) |
| | inst 16 | |
| ;LLM 15 | | |
| | inst 18 | |

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

We claim:

1. A method for compiling source code into optimized object code comprising the steps of:
   (a) compiling the source code into object code instructions;
   (b) inserting within each object code instructions, logical line markers, each logical line marker identifying a source code line from which originated associated object code instructions which are immediately adjacent to the logical line marker;
   (c) inserting actual line markers so that an actual line marker is associated with every object code instruction, the actual line marker identifying a source code line from which originated the object code instruction associated with the actual line marker; and,
   (d) optimizing the object code instructions to produce the optimized object code, including the following substeps
      (d.1) moving object code instructions relative to the logical line markers but not moving the logical line markers relative to each other, and
      (d.2) when an object code instruction is moved, moving the actual line marker associated with the moved object code instruction.

2. A method as in claim 1 wherein step (b) includes dividing the object code instructions into basic blocks which contain the logical line markers and the object code instructions.

3. A method as in claim 2 wherein in substep (d.1), no logical line marker is moved outside a basic block in which the logical line marker was originally placed.

4. A method as in claim 3 wherein in substep (d.1), when an entire basic block is duplicated, all logical line markers contained by the entire basic block are also duplicated.

5. A method as in claim 3 wherein in step (d) when a basic block is rendered unexecutable, all logical line markers contained by the basic block rendered unexecutable are marked as unexecutable.

6. A method as in claim 5 wherein in step (d) no logical line markers are deleted.

7. A method for compiling source code into optimized object code comprising the steps of:
   (a) compiling the source code into object code instructions;
   (b) inserting within the object code instructions, logical line markers, each logical line marker identifying a source code line from which originated object code instructions immediately adjacent to the logical line marker; and,
   (c) optimizing the object code instructions to produce the optimized object code, including moving object code instructions relative to the logical line markers but not moving the logical line markers relative to each other.

8. A method as in claim 7 wherein step (b) includes dividing the object code into basic blocks and wherein in step (c) no logical line marker is moved outside a basic block in which the logical line marker was originally placed.

9. A method as in claim 8 wherein in step (c) when an entire basic block is duplicated, all logical line markers contained by the entire basic block are also duplicated.

10. A method as in claim 8 wherein when a basic block is rendered unexecutable, all logical line markers contained by the basic block rendered unexecutable are marked as unexecutable.

11. A method as in claim 10 wherein in step (c) no logical line markers are deleted.

12. A method as in claim 7 wherein in step (c) no logical line markers are deleted.

13. A method as in claim 7 wherein step (b) additionally includes inserting actual line markers so that an actual line marker is associated with every object code instruction, the actual line marker identifying a source code line from which originated the object code instruction associated with the actual line marker.

14. A method as in claim 13 wherein in step (c) wherein when an object code instruction is moved, the actual line marker associated with the moved object code instruction is moved with the moved object code instruction.

15. Storage media which stores a compiling program which when executed by a computer compiles source code into optimized object code, the compiling program comprising:

compiling means for compiling the source code into object code instructions;

inserting means for inserting within the object code instructions, logical line markers, each logical line marker identifying a source code line from which originated object code instructions immediately adjacent to the logical line marker; and, optimizing means for optimizing the object code instructions to produce the optimized object code, including moving object code instructions relative to the logical line markers but not moving the logical line markers relative to each other.

16. Storage media as in claim 15 wherein the inserting means includes dividing means for dividing the object code into basic blocks and wherein when the optimizing means optimizes the object code instructions no logical line marker is moved outside a basic block in which the logical line marker was originally placed.

17. Storage media as in claim 16 wherein when the optimizing means optimizes the object code instructions and an entire basic block is duplicated, all logical line markers contained by the entire basic block are also duplicated.

18. Storage media as in claim 16 wherein when a basic block is rendered unexecutable, the compiling program renders all logical line markers contained by the basic block rendered unexecutable are marked as unexecutable.

19. Storage media as in claim 15 wherein no logical line markers are deleted are deleted during optimization.

20. Storage media as in claim 15 the compiler additionally comprises second inserting means for inserting actual line markers so that an actual line marker is associated with every object code instruction, the actual line marker identifying a source code line from which originated the object code instruction associated with the actual line marker.

21. Storage media as in claim 20 wherein when the optimizing means optimizes the object code instructions and an object code instruction is moved, the actual line marker associated with the moved object code instruction is moved with the moved object code instruction.

* * * * *